(12) United States Patent
Krishnan et al.

(10) Patent No.: US 6,301,296 B1
(45) Date of Patent: Oct. 9, 2001

(54) DIGITAL IMPAIRMENT LEARNING SEQUENCE

(75) Inventors: Vedavalli Gomatam Krishnan, Raleigh; Jeffrey Allan Green, Wake Forest, both of NC (US); Xuefeng Jiang, Newark, CA (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/592,539

(22) Filed: Jun. 12, 2000

Related U.S. Application Data (60) Provisional application No. 60/140,705, filed on Jun. 24, 1999, and provisional application No. 60/140,825, filed on Jun. 28, 1999.

(51) Int. Cl.⁷ ............................ H04B 1/38; H04L 5/16
(52) U.S. Cl. ................................................ 375/222
(58) Field of Search ............................ 375/222, 223; 370/248, 252, 507, 523

(56) References Cited

U.S. PATENT DOCUMENTS

| | | | |
|---|---|---|---|
| 5,751,741 | 5/1998 | Voith et al. ..................... | 371/37.7 |
| 5,802,111 | 8/1998 | Diehl et al. ..................... | 375/259 |
| 5,822,371 | 10/1998 | Goldstein et al. ............... | 375/242 |
| 5,825,816 | 10/1998 | Cole et al. ...................... | 375/222 |
| 5,828,695 | 11/1998 | Webb .............................. | 375/219 |
| 5,831,561 | 11/1998 | Cai et al. ........................ | 341/106 |
| 5,838,268 | 11/1998 | Frenkel ........................... | 341/11 |
| 5,838,724 | 11/1998 | Cole et al. ...................... | 375/222 |
| 5,844,940 | 12/1998 | Goodson et al. ................ | 375/222 |
| 5,844,944 | 12/1998 | Betts et al. ..................... | 375/298 |
| 5,862,179 | 1/1999 | Goldstein et al. ............... | 375/242 |
| 5,862,184 | 1/1999 | Goldstein et al. ............... | 375/295 |
| 6,023,493 | * 2/2000 | Olafsson ......................... | 375/354 |
| 6,065,030 | * 5/2000 | Zhang ............................. | 708/491 |
| 6,088,334 | * 7/2000 | Davenport et al. ............. | 370/252 |

* cited by examiner

*Primary Examiner*—Don N. Vo
(74) *Attorney, Agent, or Firm*—Robert P. Bell; Steven Lin (57) ABSTRACT

A Digital Impairment Learning sequence which is designed for providing reliable estimate of digital impairments such as PAD, RBS, and CODEC type in the presence of analog impairments such as IMD, noise and changing line conditions. This estimate is used to derive optimum transmit symbol constellations for a modem connected digitally to a trunk so as to maximize its data transmission rate.

28 Claims, 11 Drawing Sheets

| | Sign and Training Pattern | | | | | |
|---|---|---|---|---|---|---|
| Frame | Slot 1 | Slot 2 | Slot 3 | Slot 4 | Slot 5 | Slot 6 |
| 1 | +R | -T | -R | +T | -R | -T |
| 2 | +T | +R | -T | +R | +T | -R |
| 3 | +R | +T | -R | +T | -T | -R |
| 4 | -T | +T | +R | +T | -T | +T |
| 5 | +T | -R | -T | +T | -T | +R |
| 6 | -T | +T | +T | -T | -R | -T |
| 7 | +T | -T | +T | +R | +T | -T |
| 8 | -R | -T | +T | -T | +T | -T |
| 9 | +T | +R | +T | -T | +R | -T |
| 10 | +R | -T | +T | +R | -T | -R |
| 11 | -T | +T | -T | -T | +T | +T |
| 12 | +T | -R | -T | +T | +R | +T |
| 13 | -R | -T | +T | -R | -T | +T |
| 14 | -T | +T | -R | +T | -T | +R |
| 15 | -T | +T | +R | -T | +R | +T |
| 16 | -T | -R | +T | -R | -T | +R |
| 17 | -T | -T | +R | +T | +T | -T |
| 18 | +T | +R | -T | -T | +T | -T |
| 19 | -R | +T | -T | -T | -R | +T |
| 20 | +T | -T | -T | -R | +T | +T |

The "T" in the table represents a training amplitude.
The "R" in the table represents a reference amplitude.
The "+" or "-" represents the sign of the symbol.

Figure 1

| Frame | Sign and Training Pattern | | | | | |
|---|---|---|---|---|---|---|
| | Slot 1 | Slot 2 | Slot 3 | Slot 4 | Slot 5 | Slot 6 |
| 1 | +R | -T | -R | +T | -R | -T |
| 2 | +T | +R | -T | +R | +T | -R |
| 3 | +R | +T | -R | +T | -T | -R |
| 4 | -T | +T | +R | +T | -T | +T |
| 5 | +T | -R | -T | +T | -T | +R |
| 6 | -T | +T | +T | -T | -R | -T |
| 7 | +T | -T | +T | +R | +T | -T |
| 8 | -R | +R | +T | -T | +T | -T |
| 9 | +T | -T | +T | +R | +R | -R |
| 10 | +R | -T | -T | -T | -T | +T |
| 11 | -T | +T | -T | +T | +T | +T |
| 12 | +T | -R | +T | -R | +R | +T |
| 13 | -R | -T | -T | +T | -T | +T |
| 14 | -T | +T | -R | -T | +R | +R |
| 15 | -T | +T | +R | -R | -T | +T |
| 16 | -T | -R | +R | +T | +R | +R |
| 17 | -T | -T | +R | -T | -T | -T |
| 18 | +T | +R | -T | +T | +T | +T |
| 19 | -R | +T | -T | -T | -R | +T |
| 20 | +T | -T | -T | -R | +T | +T |

The "T" in the table represents a training amplitude.
The "R" in the table represents a reference amplitude.
The "+" or "–" represents the sign of the symbol.

PCM - an 8-bit μ law or A-law digital symbol transmitted over the network. The symbol represents a signal amplitude.
Linear - the linear value corresponding to the digital symbol (see G.711).
Analog - the local twisted-pair from the central office to the modem.

$$Error = \frac{\sum_{n=Ucode\ 72}^{Ucode\ 105} |Received\ Sample_n \cdot Test\ Fraction - SLICED[Received\ Sample_n \cdot Test\ Fraction]|}{Test\ Fraction}$$

SLICED[x] - results in the G.711 value closest to x.
Ucode# - refers to PCM symbols sent by the server (see V.90 specification)
Received Sample$_n$ - an average received value from the DIL sequence corresponding to Ucode#.
Test Fraction - a value between 1.0 and 0.25 that is adjusted to result in a minimum error

Figure 10

| U - Code Sent | Avg. Received Value | Using 0.5 as the Text Fraction | Absolute Error | Using 0.5077 as the Test Fraction | Absolute Error |
|---|---|---|---|---|---|
| 90 | 6673 | 3337 | 51 | 3388 | 0 |
| 91 | 6925 | 3463 | 53 | 3516 | 0 |
| 92 | 7178 | 3589 | 55 | 3644 | 0 |
| 93 | 7430 | 3715 | 57 | 3772 | 0 |
| 94 | 7682 | 3841 | 59 | 3900 | 0 |
| 95 | 8060 | 4030 | 62 | 4092 | 0 |
| 96 | 8060 | 4030 | 62 | 4092 | 0 |
| 97 | 8564 | 4282 | 66 | 4348 | 0 |
| 98 | 9068 | 4534 | 70 | 4604 | 0 |
| 99 | 9573 | 4787 | 73 | 4860 | 0 |
| 100 | 10077 | 5039 | 77 | 5116 | 0 |
| 101 | 10581 | 5291 | 81 | 5372 | 0 |
| 102 | 11085 | 5543 | 85 | 5628 | 0 |
| 103 | 11590 | 5795 | 89 | 5884 | 0 |
| 104 | 12094 | 6047 | 93 | 6140 | 0 |
| 105 | 12598 | 6299 | 97 | 6396 | 0 |

DIGITAL IMPAIRMENT LEARNING SEQUENCE

CROSS-REFERENCE TO RELATED APPLICATIONS

The present application claims priority from Provisional U.S. Patent Application Ser. No. 60/140,705 filed Jun. 24, 1999 and Provisional U.S. Patent Application Ser. No. 60/140,825 filed on Jun. 28, 1999, both of which are incorporated herein by reference.

The subject matter of the present invention is related to that in the following co-pending U.S. Patent Applications:

Ser. No. 09/598,934 filed Jun. 22, 2000 entitled "Pad Detection";

Ser. No. 09/598,680 filed Jun. 21, 2000 entitled "Inter-Modulation Distortion Detection";

Ser. No. 09/572,860 filed May 18, 2000 entitled "Constellation Generation and Re-evaluation", which is incorporated herein by reference; and Ser. No. 09/579,529, filed May 26, 2000 entitled "Receiver Codec Super Set Constellation Generator" filed May 26, 2000, which is incorporated herein by reference.

FIELD OF THE INVENTION

The present invention relates generally to an improved technique for generating and using a learning sequence for a modem. In particular, the present invention is directed towards an improved digital impairment learning sequence which accommodates detection of Robbed-Bit Signaling (RBS), Digital Pad and Line CODEC type particularly for use with V.90 modems or the like.

BACKGROUND OF THE INVENTION

The necessity of digital communication over existing communications networks, such as telephone companies, has necessitated the use of increasingly complex and efficient modulators/demodulators (modems). Because most communication systems were originally designed as analog systems, conventional modems have always been limited by the necessity of analog capabilities. Consequently, such modems operate as if the entire communications network, such as a public switch telephone network (PSTN), is an analog system, even though much of the communication throughout the PSTN is digital in nature.

Figure 3:
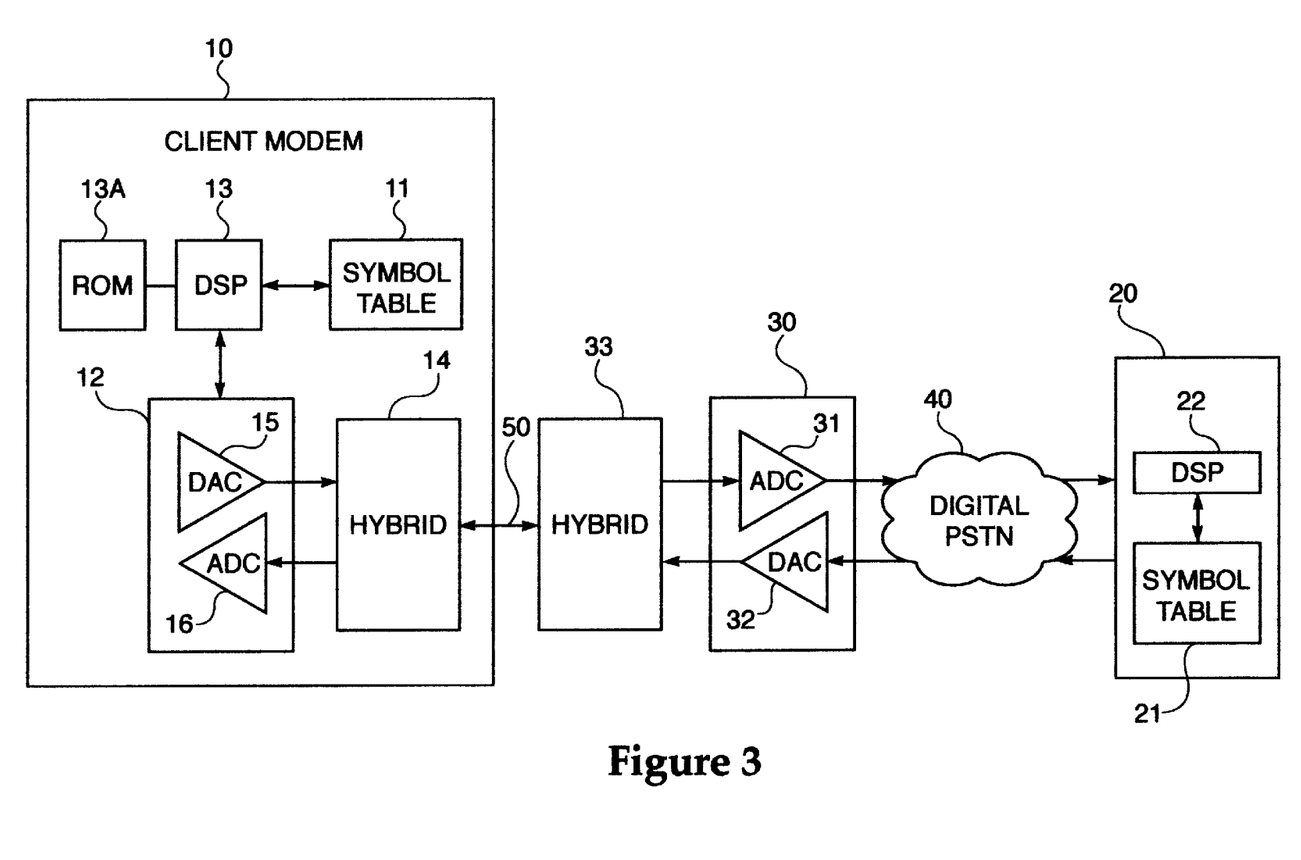
FIG. 3 is a block diagram depicting the overall communication system in which the present invention operates.

FIG. 3 is a block diagram of a communications system, which includes a digital public switch telephone network (PSTN) 40. Remote or client modem 10 communicates with a server modem installation 20 through digital PSTN 40. In order to communicate with the digital portion 40 of the PSTN, it may be necessary to communicate over an analog link 50. Accordingly, digital information at client modem 10 is converted to analog signals, transmitted over analog link 50 (generally designated as a local loop), and transmitted to PSTN circuitry 33, which is a hybrid that converts the 2 wire bi-directional local loop signal to 4 wire transmit and receive pair of signals and 30, which is a network interface that does the conversion from the analog loop signals to digital trunk signals using ADC 31, and also does the PCM encoding in case a mu-law or A-law CODEC interface is used and transmitted into digital portion 40 of PSTN 40.

Such systems are characterized by the use of an analog-to-digital converter (ADC) 31, which is used to digitize analog signals for transmission to a digital portion of the PSTN 40. Two types of quantization systems may be used in such systems, mu-law and A-law. Both systems encompass signal compression algorithms to maximize the dynamic range of an analog signal that could be represented by 8 bits. Both of these systems are used to optimize the PSTN for traditional voice communications.

Unfortunately, the wide dynamic range of normal speech does not lend itself well to efficient linear digital encoding. Digitizing is done in both systems by limiting the Signal to Quantization noise of the signals thus reducing the bandwidth required for each call. These encoding systems impose significant limitations on data communications.

Client modem 10 may typically transmit data using a digital-to-analog converter (DAC) 15 to convert digital signals into analog signals. Eventually, the analog signal is received and converted back to digital form by an analog-to-digital converter (ADC) 31 somewhere in the PSTN 40. When the analog signal levels transmitted by DAC 15 in client modem 10 do not accurately correspond to the quantization intervals used by receiving ADC 31, the data transmitted may not be properly converted back into the exact digital form originally sent. If receiving ADC 31 incorrectly converts an analog signal transmitted, receiving modem (e.g., server modem 20) may not receive the same data which was transmitted. The same is true in the downstream direction of server digital modem 20 to client analog modem 10.

In order to avoid such communications errors, certain error-checking protocols may be used. However, such protocols may require retransmission of corrected data, thereby reducing the rate at which data can be transmitted. The result is greatly reduced digital efficiency for the PSTN constituting the digital communications system.

Under the V.90 standard, a modem at a client computer may request that a server modem transmit a learning sequence in order to characterize the data channel. The V.90 specification does not specify a particular learning sequence and thus each manufacturer or communications system operator may use an unique learning sequence to characterize the data channel.

In some T1 lines, a telephone company (Telco) may use one of a number of time-division multiplexed channels for transmission of control data. However, in other instances, a technique of "robbed bits" (RBS) may be used to transmit control data for use by the Telco. In the robbed bit signaling technique, a least significant bit of one or more slots is used during initial connection to transmit control data from one portion of the Telco to another indicating numbered dialed, hang up, and the like. During data transmission, this same least significant bit may be set to a predetermined value (e.g., 0 or 1), or may be toggled.

In traditional voice communications signalling, Robbed Bit techniques produced few problems, as arbitrarily changing the least significant bit of a digitized audio signal does not produce any noticeable audio artifacts in the resultant analog audio signal. However, in a digital signalling environment, such legacy techniques as Robbed Bit Signalling create problems for digital data transmission. Arbitrarily changing the least significant bit in a data stream may produce a digital data transmission error.

The wide variety of digital system characteristics means digital impairments such as RBS and pad variations, as well as CODEC types which would modify the digital information the server outputs before it is converted to analog information that the client receives. Apart from these there could be analog impairments such as line distortion, noise and Inter-Modulation Distortion (IMD) which could create conditions for greater communications errors. Consequently, additional techniques are necessary to properly measure the pad and accommodate any RBS such that received signals can be properly adjusted to reflect the reality of those signals as sent, rather than theoretical values, which may prove to be incorrect.

SUMMARY OF THE INVENTION

In the present invention, a novel learning sequence is used which compensates for different types of digital data channels used by telephone companies, as well as digital impairments.

A unique Digital Impairment Learning (DIL) sequence may be transmitted during the digital hand shake procedure, or in other predetermined time slots, based upon certain signaling protocols requested by a client or user modem. The DIL sequence is designed such that the net sum of all the elements in the pattern over a specific period comes to zero. A net sum of zero is required since a telephone system may not readily transmit a signal with a DC offset. In the DIL sequence of the present invention, this zero sum occurs every twenty frames and the pattern is generated in such a way that the zero sum will be achieved regardless of whether RBS is used or which type of RBS is used.

The objects and goals of the present invention are achieved by a communication system with digital and analog sections. The communication system includes at least one client modem and at least one server modem separated by at least one of the digital sections. The client and server modem are arranged to exchange a Digital Impairment Learning (DIL) sequence between them. The client modem includes an apparatus for sending first parameter signals to the server modem. The server modem includes an apparatus for sending training symbols to the client modem based upon the first parameter signals.

The second aspect of the present invention is directed to a method of operating a client modem in a communication system. The client modem is configured to receive training signals provided in a DIL sequence from a server modem. The method includes the steps of sending first parameter signals from the client modem to the server modem, and receiving training symbols in a DIL sequence at the client modem. The server modem sends the training symbols configured in accordance to the first parameter signals.

DETAILED DESCRIPTION OF THE INVENTION

Figure 13:
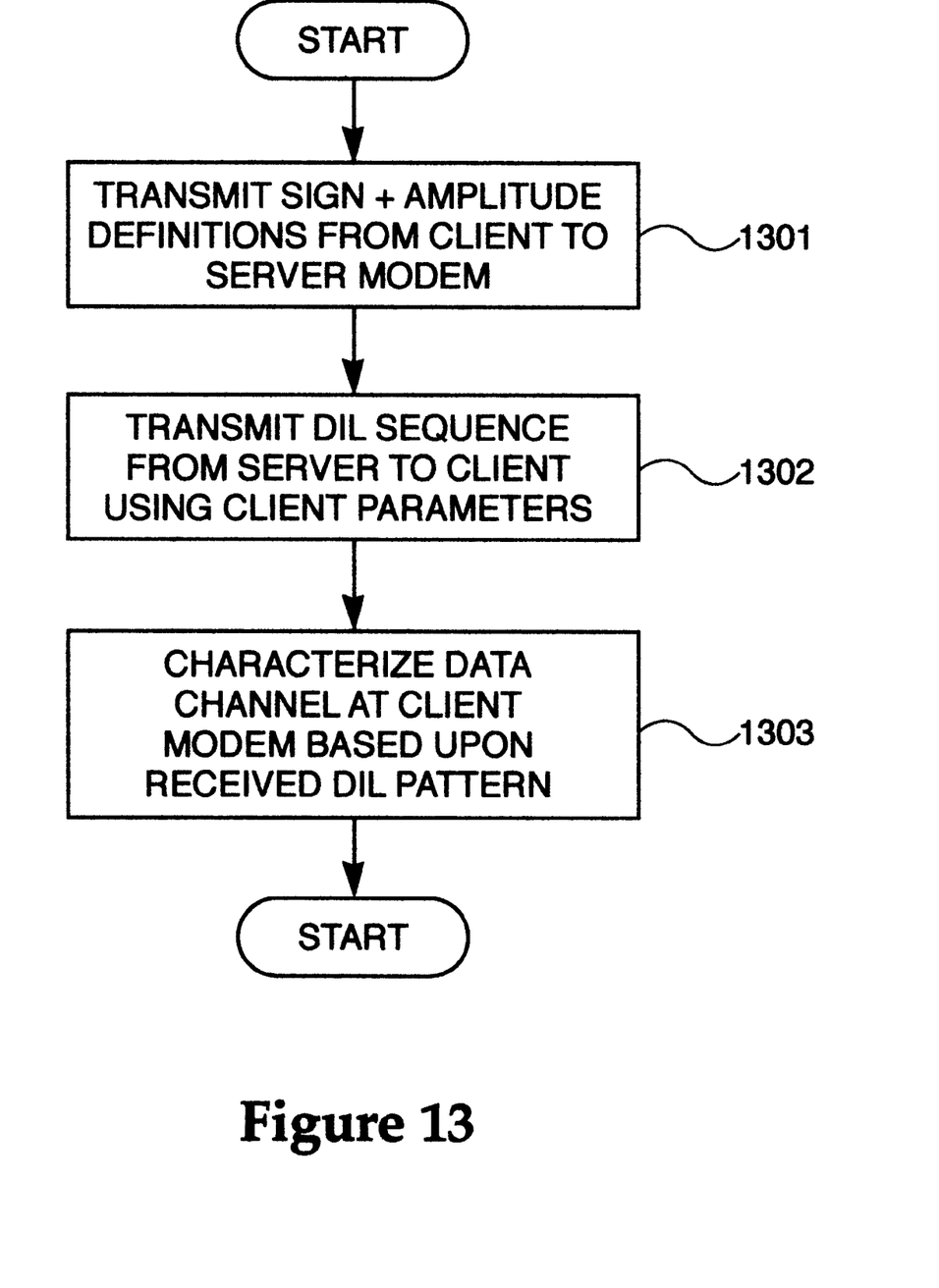
FIG. 13 is a flowchart illustrating the basic steps in generating and receiving the DIL pattern to characterize the data channel.

FIG. 13 is a simplified flowchart illustrating the basic steps in generating and receiving the DIL pattern in order to characterize the data channel. In step 1301, a client modem transmits sign an amplitude information for the DIL pattern to the server modem. Sign and amplitude data may include training level, reference level, sign pattern, training pattern and DIL segment length.

Training level may represent a G.711 symbol amplitude that the client modem will use for learning about the data channel. Reference level may represent a G.711 symbol amplitude which is known by the client modem, and used to maintain stability during the DIL sequence. Sign Pattern may represent a series of bits representing the sign of the symbol to be transmitted, for example, 0 being negative and 1 being positive. Training Pattern may represent a series of bits representing the level to be transmitted, for example, 0 being reference, 1 being training. DIL Segment Length may represent the number of frames (6 symbols per frame) in which the current training level and pattern should be transmitted.

From these parameters, a server modem may generate a DIL sequence as illustrated in step 1302, for transmission to a client modem. In step 1303, the client modem received the DIL sequence from the server modem. Since the client modem has defined the parameters of the learning sequence, the client modem can compare the received sequence with an expected sequence (based upon its transmitted parameters) and characterize the data channel based upon the difference between the two signals.

Note that since the client modem defines the parameters for the DIL sequence, different brands or models of client modems may use different DIL sequences. Since the server modem (in the V.90 specification) will generate a DIL sequence based upon client DIL parameters, the server modem need not be modified to interface with a number of modems of different brand or type. Moreover, DIL sequences may be updated or improved without necessarily changing hardware within the server modem.

FIG. 3 depicts a portion of a communications system, which includes a digital public switch telephone network (PSTN) 40. All of the elements depicted in FIG. 3 represent standard components within a typical communications system. As such, the system depicted in FIG. 3 merely depicts the environment in which the present invention operates. Components such as modem 10, are part of the present invention and may be altered in terms of the programming provided to DSP 13 and the data found in symbol table 11.

DSP 13 may receive stored instructions from RAM/ROM 13A which may contain software embodying the present invention. Such a "software modem" as the term as known in the art, may be programmed to operate in order to perform different functions. Thus, various means encompassed by the present invention may be realized in a combination of software and hardware as exemplified by DSP 13 and RAM/ROM 13A.

The present invention may likewise be found in the data exchanged between client modem 10 and server modem 20. Otherwise, the components may be typical of those found in conventional systems.

Figure 4:
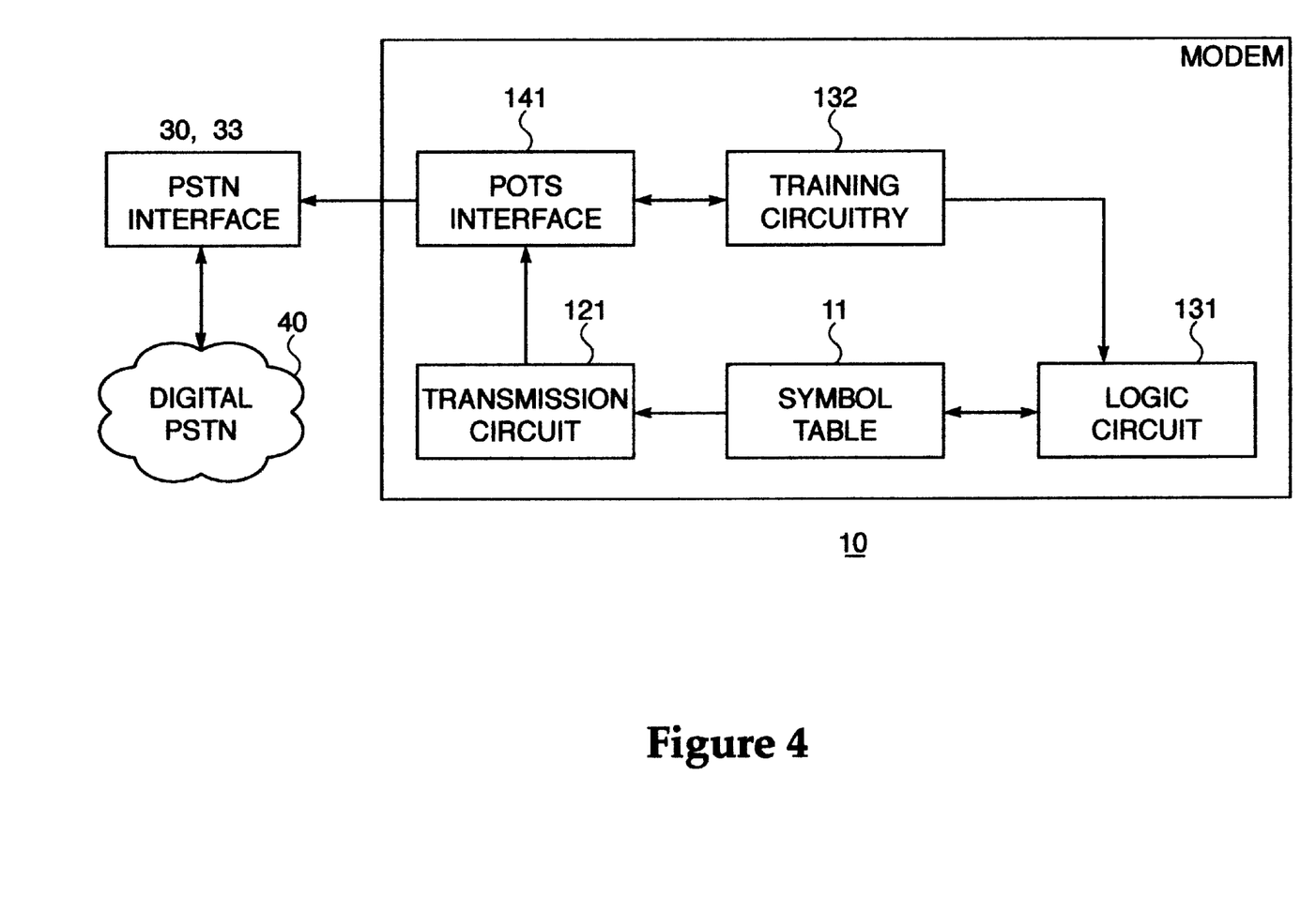
FIG. 4 is a schematic diagram of a modem configured in accordance with the present invention.

FIG. 4 depicts functional circuitry of a client modem 10 which may be used to carry out the operation of the present invention. It is to be understood that the present invention is not limited to a specific communication device or type of communication device. Rather, the devices depicted in FIGS. 3 and 4 are merely exemplary in nature.

As depicted in FIG. 4, the client modem 10 includes a telephone interface 141 coupled to training circuitry 132 which determines the signal conversion guide values of DAC 32 in the PSTN analog interface 30,33.

A symbol table 11 is used for storing a constellation of symbols for the upstream and downstream channels. A logic circuit 131 is used for selecting optimal constellations in accordance with conventional functionality as well as carrying out the calculations of the present invention which compensate for variations in pad, IMD and RBS. Such information is transmitted from the client modem 10 to the server modem 20 via interface circuitry 33, 30 and the digital PSTN 40. This is accomplished using transmission circuit 121, operating through the telephone interface 141.

Although client modem 10 is depicted as including a number of discrete circuits for each function, it should be recognized that the modem employing the principals of the present invention may be integrated into one or more semiconductor devices without limitation. Examples of such devices are digital signal processors (DSP) such as device 13 in FIG. 3, microprocessors, Applications Specific Integrated Circuits (ASIC) and programmable read-only memories (PROM).

In the present invention, training circuitry 132, or it's functional equivalent, is responsible for sending signaling parameters (such as the designation of the sign and amplitude of the training signals) to the server modem 20. In the conventional art, the training circuit 132 also operates to determine signal conversion values for ADC 31 and DAC 32 at the server modem 20. A base constellation stored in symbol table 11 is accessible for the functionality of training circuit 132, as is the capability of adjusting equalizers (not shown) used in the DAC 15 and ADC 16 of the client modem 10. This functionality is necessary for carrying out the present invention since coefficients have to be developed to operate on received signals to obtain actual readings as opposed to theoretical or idealized values.

The structure of the digital portion of the telephone network significantly affects the performance of V.90 type modems. Digital data is transmitted as 8-bit bytes, or symbols, as defined by the G.711 standard. There are six symbols in a frame. The V.90 standard uses U-codes 0 to 127 to represent symbols from both mu-law and A-law, standard G.711 tables. Digital pad, robbed-bit signaling (RBS), CODEC type are the primary digital impairments which must be discovered during each connection to optimize the data rate for that connection. IMD is calculated and removed before the digital impairment estimation. Noise is minimized using averaging, echo is cancelled and Other analog impairments are compensated by the adaptive loops in the modem receiver during training.

In the present invention, optimization is carried out by calculating the effects on the symbols received from the server modem 20 as caused by such system characteristics as RBS, pad, CODEC, Inter-Modulation Distortion (IMD) and noise. The calculations are performed to determine the effects of each of these factors, as well as other system characteristics, both in the effects on actual signals received and the effects in the correction calculations.

Through a series of calculations, the effects of each digital impairment is quantized until an error level between received signals and the idealized values in symbol table 11 of the client modem are accurately determined. Once errors can be determined, an optimized co-efficient can be selected from a number of candidate values (described in the present disclose as test fractions). Error levels and test fractions may be used in one embodiment of the present invention to detect the presence of digital pads in the connection.

Digital pad is a loss measured in dB which reduces the power of the signal being transmitted. Typical pad's are 0dB, 3dB, and 6dB although other pads are possible. A 3dB pad causes the analog signal at the output of the digital network to be approximately half the power of the digital signal when it is transmitted from the server.

Robbed-bit Signaling (RBS) is a signaling method used by digital networks to send control data between digital equipment on the telephone network. RBS uses the least-significant bit of the same slot in each frame to send this data. During the connection, this bit may be set to always one, always zero, or toggling one and zero. Therefore, the digital network may change one of every six symbols to a different value than was originally sent.

RBS may be applied before the pad occurs or after the pad occurs. Depending upon the number of digital links in the phone connection, multiple slots can be used for RBS. For example, the least-significant bit of the second slot in a frame may always be set to one before the pad and the least-significant bit of the third slot in a frame may be toggling one and zero after the pad.

The structure of the Digital Impairment Learning (DIL) Sequence is part of the V.90 standard. There are a number of parameters which are set by the client modem 10 and sent to the server modem 20 to define the transmission during the DIL sequence. The purpose of the sequence is for the client modem 10 to learn how the digital channel is structured so optimum constellations can be formed for data transfer.

A DIL sequence consists of a series of training symbols transmitted by the server modem, whose sign and amplitude are defined by the client modem. Parameters defined by the client modem for a DIL sequence are:

Training Level—a G.711 symbol amplitude which the client modem will use for learning about the channel;

Reference Level—a G.711 symbol amplitude which is known by the client modem, and used to maintain stability during the DIL sequence;

Sign Pattern—a series of bits representing the sign of the symbol to be transmitted, for example, 0 being negative and 1 being positive;

Training Pattern—a series of bits representing the level to be transmitted, for example, 0 being reference, 1 being training; and, DIL—Segment Length—the number of frames (6 symbols per frame) in which the current training level and pattern should be transmitted.

The training sign pattern is repeated until the end of the DIL-segment at which point they are restarted from the beginning. The magnitudes of the repeated training symbols are averaged together for each data or symbol slot in a frame during each DIL-segment. At the end of a DIL-segment, the six numbers representing the average magnitude of the training symbols for the slots in that segment are stored in a table. These numbers are used for detecting the use of RBS and the pad and IMD in the digital network.

Figure 1:
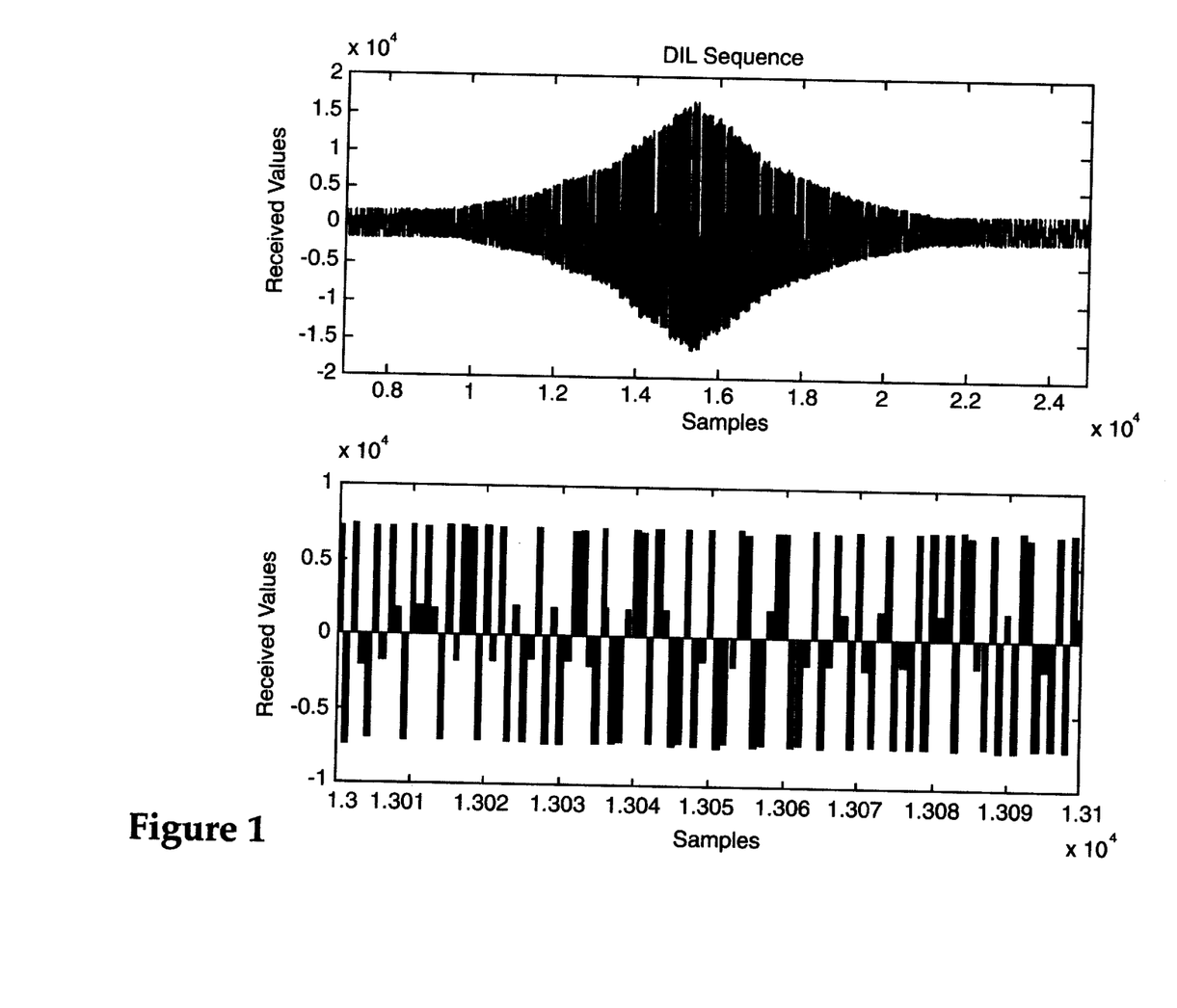
FIG. 1 is a graphic illustration depicting one example of a DIL sequence of the present invention, with the upper portion of the Figure illustrating the DIL sequence, and the lower portion of the Figure illustrating an enlarged portion of the DIL sequence, emphasizing training and reference levels.

FIG. 1 depicts an example of a DIL sequence. The top graph is an entire DIL sequence. The bottom graph is an enlarged portion used to emphasize the training and reference levels.

An example of a DIL sequence could be:

sign pattern: 1 0 0 1 = + − − +;

training pattern: 0 1 0 1 = reference training reference training;

training levels: 2 3;

reference levels: 4 4;

DIL-segment length: 6; and,

Server transmits: +4 −2 −4 +2 +4 −2 +4 −3 −4 +3 +4 −3.

The DIL sequence of the present invention uses Ucode 62 as a reference level. This corresponds to G.711 mu-law code 193 which is preferred because it has a least-significant bit of one which is not changed when the digital network has a 0dB, 3dB, or 6dB pad. This allows for an RBS of one, the most common designation, before or after the pad without changing the signal level of the reference symbol.

There are other Ucodes with this property which may be used with the present invention. Ucode 62 was chosen as one example because it has enough power such that line noise would not have a significant affect on it. The next more powerful Ucode with this pad and RBS invariance property is Ucode 98 which could be affected by other distortions because of its high power. It should be noted that the Ucode 62 and user Ucode 98 were chosen as examples for use with the present invention because of the aforementioned characteristics of these two codes. However, other codes can be used while still maintaining the basic concepts of the present invention.

In one embodiment the equalizer taps (not shown) in the modem 10 are trained during the initial portion of the DIL using Ucode 62 as both the training and reference signal.

Signals transmitted through the telephone system are forced to have a zero DC component. Here the DIL sequence sign and training patterns are optimized so that the received levels, both training and reference, will sum to zero for each slot in the received frames every twenty frames independent of any RBS pattern received. This is done while maintaining a pseudo-random pattern during the DIL sequence.

Figure 2:
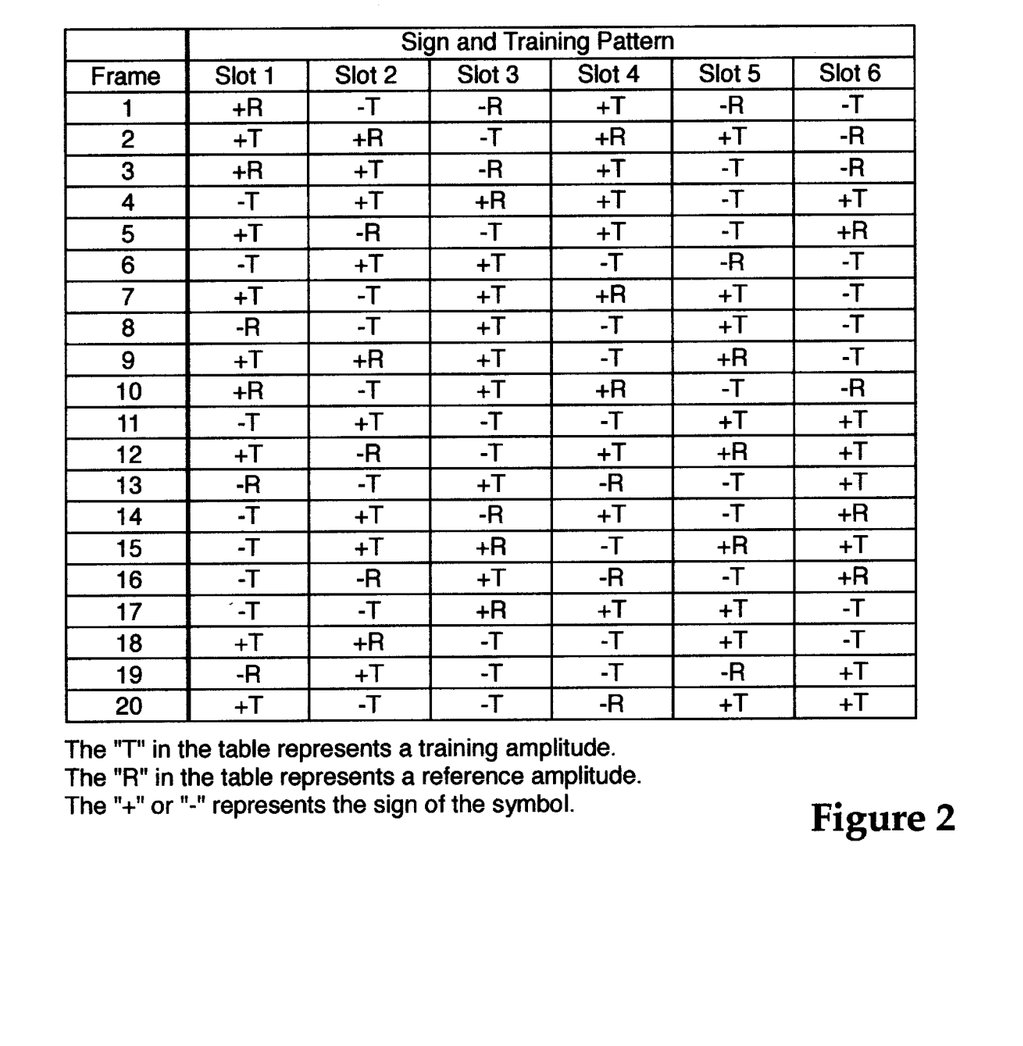
FIG. 2 is a table depicting sign and training patterns for twenty frames of a DIL sequence of one embodiment of the present invention.

A pseudo-random pattern is used so the equalizer (not shown) in the client modem 10 can be updated during the DIL sequence. If the equalizer updates are not required, a tonal pattern may be used. The training pattern has seventy percent training symbols and thirty percent reference symbols. This maximizes the number of training symbols while maintaining enough reference symbols to keep the system stable. The sign and training patterns are depicted in the table of FIG. 2. The values in this table are exemplary only, and are not necessarily the proper values for any particular communication system or modems within that system.

Training levels are used from Ucode 12 to Ucode 119 with lower powered symbols being transmitted for longer periods of time so that more symbols can be averaged together. This reduces the significance of signal variance caused by line noise in lower power symbols. In modems where noise is detected before the DIL, the duration of the DIL-segments can be adjusted to allow for sufficient averaging to remove noise. The higher power training symbols are interleaved with lower power symbols to reduce any distortions caused by excessive power in the signal path.

The DIL sequence can be provided at any time before the message data is exchanged between the client modem 10 and server modem 20. For example, both the initial transmission of parameters defining sign and amplitude from the client modem 10 and the resulting DIL can be carried out during the initial hand shake that is conventionally carried out between modems before message data is sent. Conventionally, only predefined sequences are exchanged when two modems initially make contact. However, the DIL sequence can be inserted instead of fixed sequences. In any case, the DIL sequence is sent before any message data (as opposed to the control data which is the subject of this disclosure) is exchanged between the two modems.

Another impairment, Inter-Modulation Distortion (IMD) is a non-linear distortion that deteriorates the performance of the V.90 modem. IMD creates second and third order components of the signal. Measurement and correction of the third order distortion is necessary for accurate pad detection and constellation limitation. The highest power transmitted symbols are most influenced by this impairment. Once the IMD level is quantified, a decision can be made on which high power points must be excluded from use during a data transfer. IMD levels are measured based on the data received during the Digital Impairment Learning (DIL) sequence. Equation 1 below models the affect of third-order IMD on the symbols received during the DIL sequence.

$$x' = x + ax^3 \qquad \text{Equation 1}$$

where: $x$ – transmitted symbol $x'$ – recieved symbol $a$ – constant

Figure 5:
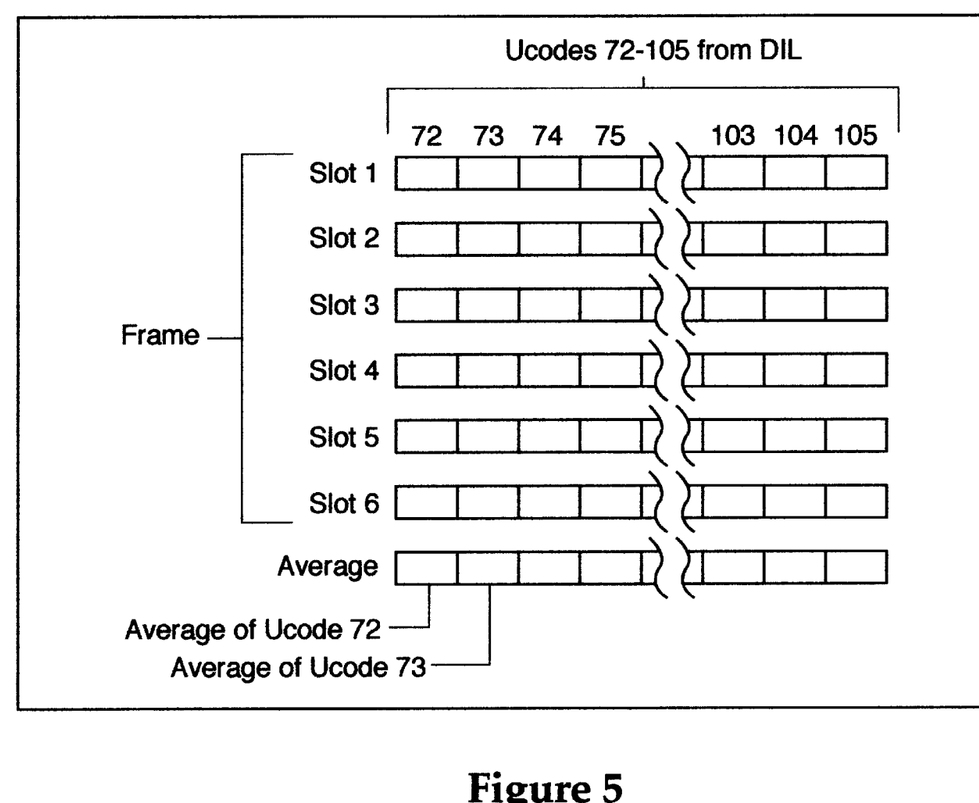
FIG. 5 is a diagram depicting the averaging operation carried out on the slots of the same received training symbol values.

The IMD measurement algorithm uses a series of averaged received symbols from the DIL sequence. The goal of the algorithm is to measure how much the difference between the symbols is expanding or contracting beyond what is normal. The data from the non-RBS slots in a frame is initially averaged as shown in FIG. 5. If one slot in the frame is used for RBS, then the other five would be averaged.

The RBS and non-RBS slots are detected by inspecting the differences between adjacent received symbols. Although pads can cause some symbol pairing, resulting in differences equal to zero, RBS causes ever other symbol to pair with an adjacent symbol. Therefore, if a slot in a frame has approximately half its received values paired, then it is an RBS slot. Thirty-four consecutive high level PCM codes corresponding to Ucode 72 to 105 may be used for this as these levels are highly noise immune.

Once the symbol values have been averaged, the differences between adjacent symbol averages are calculated. One example is provided as follows:

Difference 1=(Average of Ucode 73)−(Average of Ucode 72)

Difference 2=(Average of Ucode 74)−(Average of Ucode 73)

Difference 3=(Average of Ucode 75)−(Average of Ucode 74)

Figure 6:
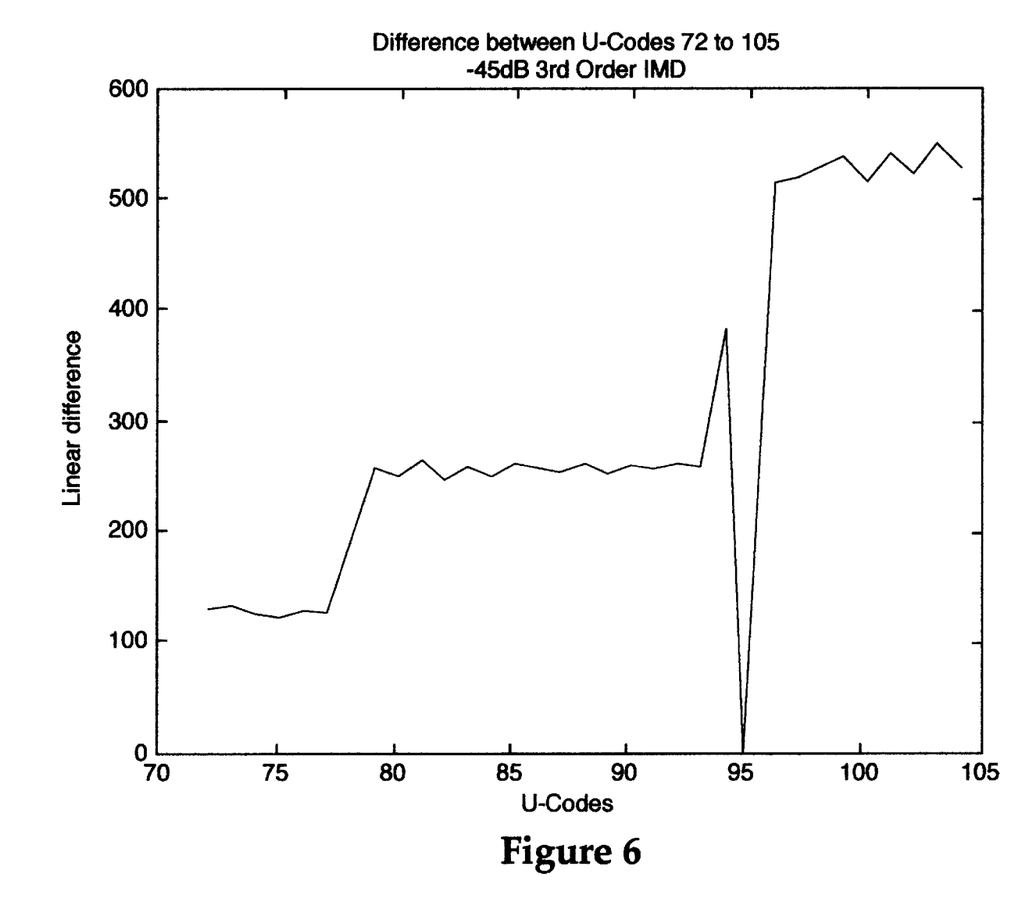
FIG. 6 is a graph plotting differences in Ucode values.

FIG. 6 is a graph depicting a plot of these differences (in adjacent symbol values) for a line with 6.02dB pad and −45dB third-order IMD.

Although the differences between adjacent symbols values will not be the same, most will be multiples (usually by a factor of two) of each other. In FIG. 6, the dominant values are approximately 128, 256, and 512. By doubling the non-zero lower values until they are approximately equal to the maximum value,it is possible to roughly normalize the differences in value. Zeros and other anomalies are replaced by averages of the values of adjacent symbols. Since different pads will produce varying values for the subject differences in adjacent symbol values, the normalized differences are multiplied by a constant that brings the average of the normalized differences to 2048. This removes any variation in the differences caused by pad.

Figure 7:
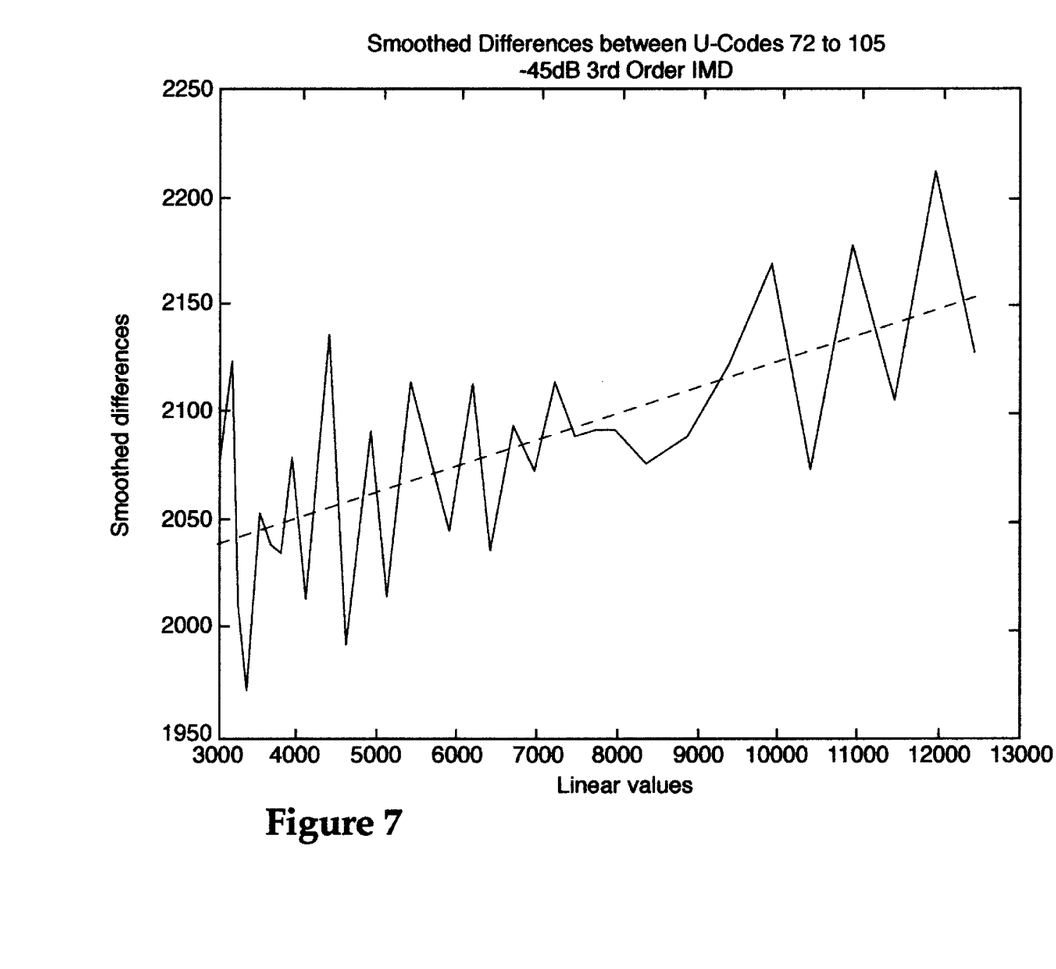
FIG. 7 is a graph depicting third order modulation distortion using the smooth differences between different Ucodes.

Third-order IMD can be seen in FIG. 7 as a slope in the data points. IMD is can be quantified by measuring the slope of the sum-of-at-least squares line though the data. This value, designated as the IMD Constant, can be used in the Equation 2 below to remove IMD distortion from the received DIL data so that accurate pad measurements can be made. Instead of subtracting the received symbol value cubed, it is preferable to use the corresponding G.711 linear value for the same Ucode as the received value. This substitution permits an accurate calculation of $(by)^3$.

$$x'' = x' - I(by^3)$$ Equation 2 where: $x''$ – recieved symbol with IMD removed $x'$ – recieved symbol $I$ – IMD constant $b$ – constant $y$ – G.711 symbol for the same Ucode as $x'$ The result is stored in a table (such as the symbol table in FIG. 11) before processing. Equation 3 is used to limit the maximum constellation point selected to one that is not significantly distorted by IMD. If the magnitude of the IMD Constant is less than 180h, no constellation limitation is attempted. The minimum point that the constellation will be limited to is Ucode 80.

Last Ucode=110−0.0241I   Equation 3 where:

Last Ucode—last allowable Ucode in the constellation

I—IMD constant

Figure 8:
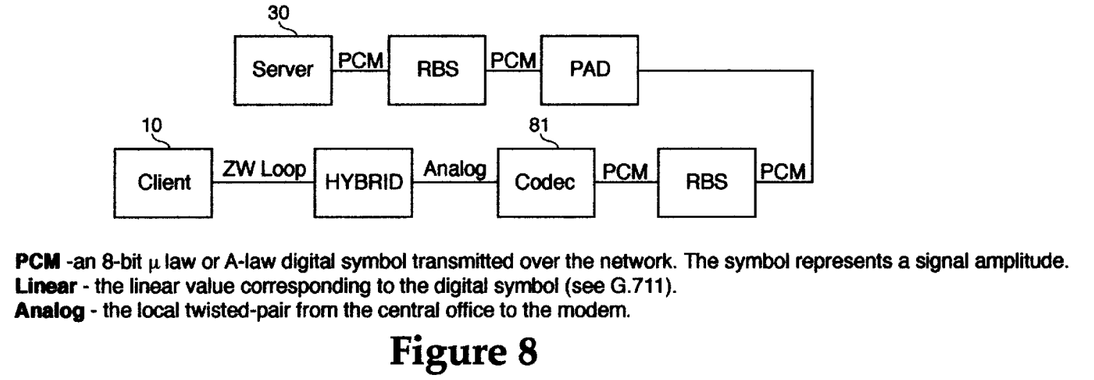
FIG. 8 is a block diagram depicting functions carried out in a communications system, which may create digital impairments.

Digital pad is defined as programmed attenuation that is built into the digital portion of many communication system, such as telephone networks. Accurate measurement of the pad for a communication system is necessary for a V.90 modem to operate at maximum speeds. FIG. 8 is a block diagram depicting various digital impairments and the functions that may cause such impairments in a typical V.90 connection.

Among the examples are the conversion of PCM to a linear format where PCM is an eight-bit mu-law or A-law digital symbol transmitted over the network. The subject digital symbol represents a signal amplitude. A linear value corresponds to the digital symbol in accordance with the G.711 standard. The analog link generally refers to the local twisted-wire pair running from the central office (CO) of the telephone company to the client modem 10. All of the depicted transformations can bring about variations that might effect the accuracy of digital communications. However, the most profound factors impacting on digital communication accuracy are RBS and pad.

Robbed-bit signaling is a major impairment which complicates pad measurement by forcing the least-significant bit of the digital byte to be between, one, zero, or alternating one and zero. However, both pad and IMD create the variable effects in the transmitted data stream so that predicting the effects of both of these factors becomes far more problematical than dealing with the known effects of RBS.

Figure 9:
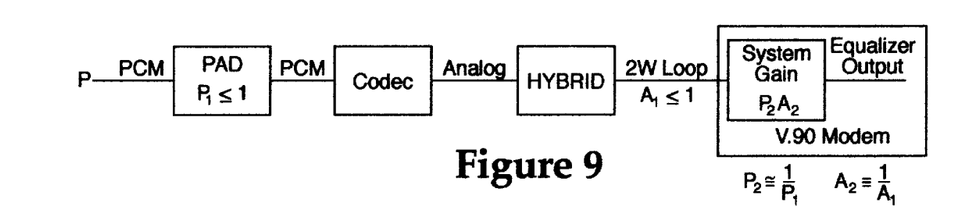
FIG. 9 is a partial representation of the block diagram of FIG. 8, emphasizing functional relationships between parts of the communications systems.

During the Digital Impairment Learning Sequence (DIL) the server 20 transmits a specified symbol amplitude that varies in sign. The digital pad and analog local-loop attenuate this symbol. The client modem 10 compensates for this attenuation by inserting a gain (as depicted in FIG. 9) that will restore the received symbol to its transmitted value. This gain is then fixed for the rest of the connection and applied to all symbols that are received. Once the gain is fixed, a broad range of symbol amplitudes are respectively transmitted by the server, averaged in the client modem, and stored in a table. Due to the Linear to PCM conversion after the pad, not all symbols require exactly the same gain to restore them to their original transmitted level.

The goal of the pad measurement algorithm (depicted in FIG. 10) is to measure the gain that the modem has applied to the signal resulting from the digital pad while ignoring the portion of the gain that compensates for any analog loss. The algorithm relies on the fact that all symbol levels at the output of the codec 81 are linear values based upon the G.711 standard table. The core logic of the algorithm is that all received symbols can be divided by a constant value equal to the gain applied by the modem due to the digital pad loss and the resulting value will be a corresponding value taken from the G.711 table. FIG. 9 illustrates that the attenuation of the pad, $P_1$, is compensated for in the modem by the gain $P_2$ that is approximately equal to $1/P_1$. It is assumed that the analog loss is exactly compensated for by the gain $A_2$. The product $P_2 A_2$ is the modem system gain.

The pad measurement algorithm (FIG. 10) is an iterative method that multiplies a range of received symbols from the DIL by various test fractions estimating $1/P_2$ between 1.0 and 0.25. Using this range of fractions, pads from 0 to 12.0 dB can be detected. In this equation the function of sliced(x) results in the G.711 value closest to the received sample. The Ucode number refers to PCM symbols sent by the server modem 20 in accordance with V.90 specifications corresponding to the specified Ucode number. The test fraction is a value between 1.0 and 0.25, which is adjusted to result in a minimum error. The purpose of the operation using this equation is to obtain the lowest possible error and a test fraction which corresponds to that error.

Figure 10:
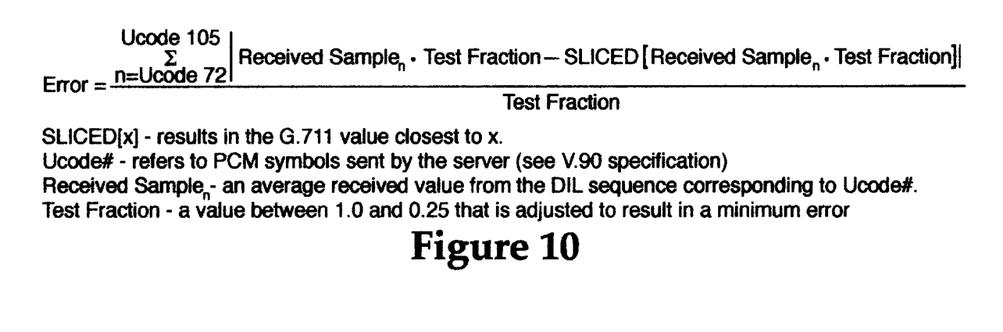
FIG. 10 is a representation of one of the algorithms used to facilitate he method of the present invention.

The results of multiplication of the received symbol level and test fraction are subtracted from the nearest G.711 linear values and the absolute differences are summed. This result is then divided by the test fraction to normalize the error sum which makes it independent of the test fraction being used. The test fraction resulting in the minimum error sum is the test fraction that approximates the digital pad. The Ucodes 72 to 105 were chosen for pad measurement because using symbols with larger amplitudes would result in a sensitivity to non-linear distortions and including smaller symbol amplitudes would not affect the error measurement significantly.

Figure 11:
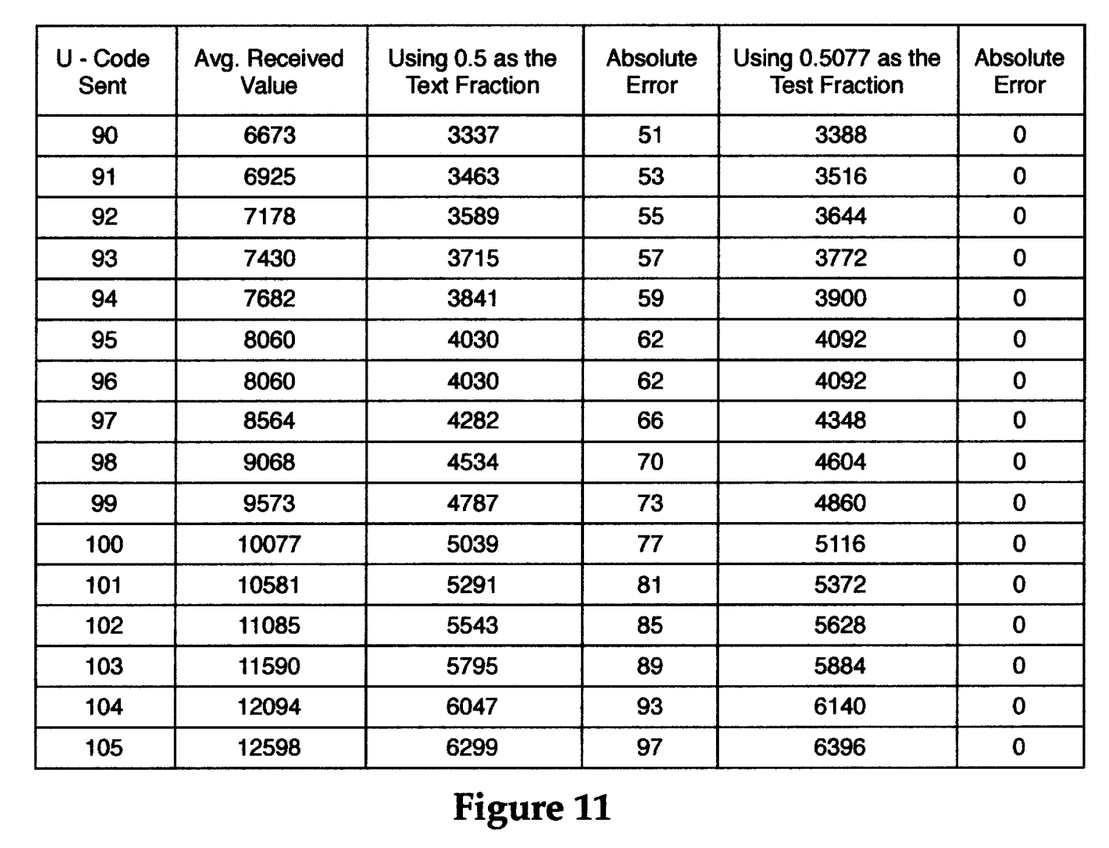
FIG. 11 is a table illustrating an example of two different test fractions used in the same set of data, illustrating the accuracy of the present invention.
Figure 12:
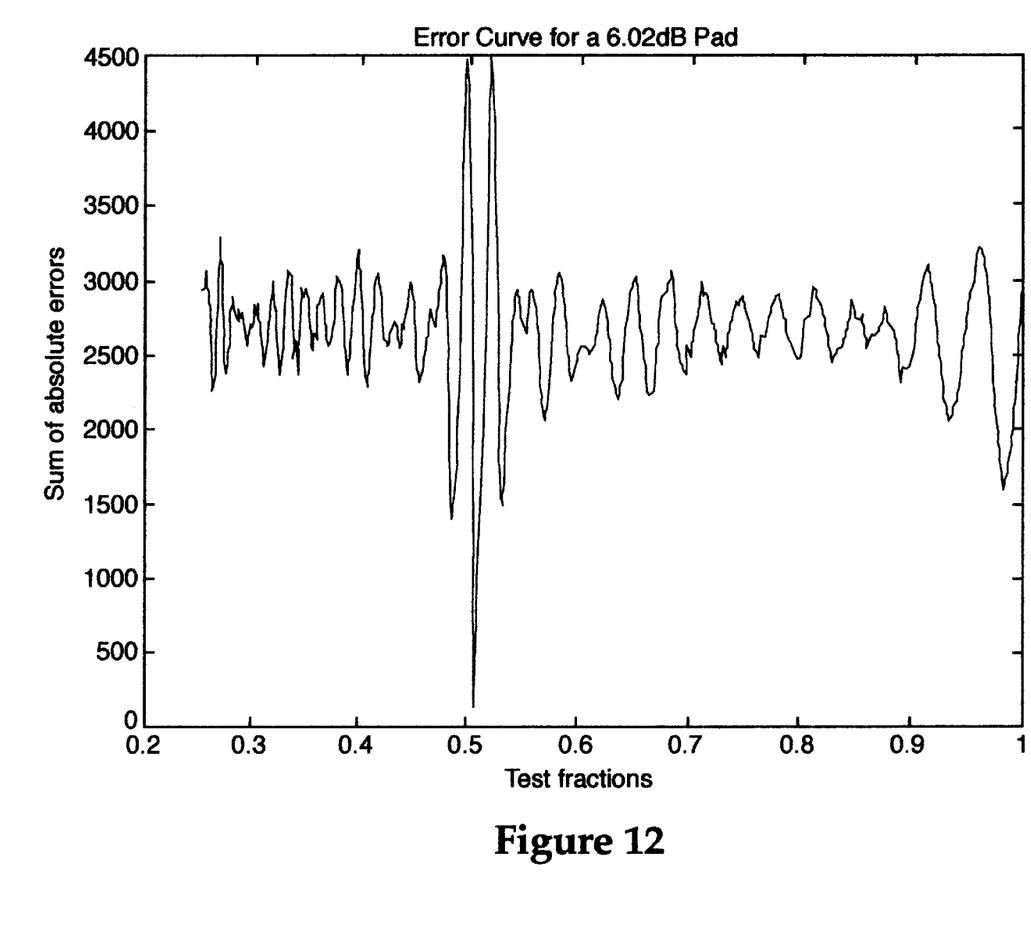
FIG. 12 is a graph depicting the plot of some absolute errors against test fractions used in determining the correct pad.

Even though the difference in the test fraction is small, the error generated by the 0.5 test fraction is very large in comparison to the 0.5077 test fraction (See FIG. 11). Since minor deviations in the test fraction result in large deviations in the error sum, the pad measurement algorithm can be accurately determine the system gain due to the digital pad. FIG. 12 is a graph of the plot of the summed absolute errors using the equation of FIG. 10 on a connection with a 6.02dB pad for all test fractions between 0.25 and 1.0. Minor variations in the error plot will be seen when the algorithm is run on RBS slots, but the pad measurement algorithm is valid for both RBS and non-RBS slots without any modification.

Equation number 4 below uses the current error at each step of the iterative process determined by the equation of FIG. 10 to result in the next test fraction. The test fraction is initially sent to 1.0 and is iteratively decremented using equation number 4.

$$TestFraction_{n+1} = TestFraction_n - \frac{Error_n \times TestFraction_n}{16 \times 32768} - \frac{1}{32768}$$

Equation 4

This method adjusts the test fraction by smaller values as the error becomes smaller. This makes the pad measurement more precise. By adding 1/32768, the step size will never become zero, which would halt the iteration.

The algorithm (of FIG. 10 and equation number 4) is run twice for DIL data sampled from each slot in the frame. Once for the mu-law G.711 codec values and once for A-law G.711 codec values. This results in the algorithm being run twelve times. A minimum error value and the corresponding test fraction are stored in memory for each run. The six minimum error value for the mu-law test are summed and the six minimum error values for the A-law test are summed. The system, mu-law or A-law, with the lowest summed error is the system to which the client modem is connected. If the summed slot errors are not below 2400h, then the client modem assumes the same system as the server modem and a 0 dB pad.

If the summed slot errors are not below 2400h, then the client modem assumes that the noise in the received DIL data is too high for accurate pad detection. In this case, a flag is established to signify a pad failure, the client modem assumes the same coding system as the server modem (mu-law or A-Law), and the pad value is set to 0dB to prevent a constellation from being generated that would cause the server modem to exceed the federal limit for transmit power.

For error sums less than 2400h, the estimate is refined further by grouping the six test fractions corresponding to the frame slots in the selected PCM coding system into two bins of those with most similar values. The test fractions in the bin with the most pad estimates are averaged together to form the final pad decision. This decision is converted in to a coefficient used to create an accurate symbol table at the client modem 10 to correct for the aforementioned digital impairments.

Some mu-law codecs violate the G.711 spec in the RBS slot by sending the transmit encode level instead of the receive decode level for a PCM code at its decoder output. These are the D4 channel bank CODECs specified in AT&T Technical Reference, PUB 43801, Nov. 1982. These RBS slots are sometimes referred to as ½ RBS slots. Detecting this further refines the codec decision. This is accomplished by measuring the slot errors using the equation of FIG. 10 at the test fraction equivalent to the final pad decision. The slot with this anomaly will have a maxima at the correct pad decision instead of a minima like all other slots. The error surface of this slot will look like FIG. 12, only upside down.

It should be noted, for example, that the present invention has been described in terms of "client" and "server" modems in conjunction with the V.90 standard. However, the present invention may be embodied in other types of configurations such as the V.91 or V.92 standard or beyond without departing from the spirit and scope of the present invention. In particular, the present invention may be used in any PCM encode/decode technique.

Although a number of embodiments of the present invention have been presented by way of example, the present invention should not be construed to be limited thereby. Rather, the present invention should be interpreted to encompass any and all variations, permutations, modifications, adaptations, embodiments and derivations that would occur to one skilled in this art, having been taught the present invention by the instant application. Accordingly, the present invention should be construed as being limited only by the following claims.

What is claimed is:

1. A Digital Impairment Learning Sequence (DILS) for a communications system where a section of the communication channel is of a digital trunk type with possible digital impairments of repetitive nature, with the repetition frame (RF) size of one or more time slots which carry the bipolar digital codes, the DIL facilitating detection of digital impairments and retrieval of original digital code from the received digital code, the DIL sequence comprising:

a first segment for training the receiver on a reference bipolar digital code with lower variance to the digital impairments for each time slot in the repetition frame; and a second segment for training the receiver on a selected set of bipolar digital codes, each bipolar digital code being interleaved with the reference bipolar digital code using a specified pattern and repeated for a code value related number of times so as to achieve adequate confidence in the received estimation of each code.

2. The Digital Impairment Learning Sequence (DILS) of claim 1, wherein the impairment repetition frame size is selected from 6 or 12 or 24.

3. The Digital Impairment Learning Sequence (DILS) of claim 1, wherein the bipolar digital code correspond to mu-law or A-law PCM encoding and is represented by an Universal code (Ucode) which is a one to one map of the PCM encoding codes in ascending magnitude order.

4. The Digital Impairment Learning Sequence (DILS) of claim 1, wherein the digital impairments correspond to Robbed Bit Signaling and/or Digital attenuation PADs and/or G.711 non compliant PCM encoding.

5. The Digital Impairment Learning Sequence (DILS) of claim 1, wherein of the first segment, Ucode 62 is used as a reference code in a mu-law and A-law encoding.

6. The Digital Impairment Learning Sequence (DILS) of claim 1, wherein of the first segment, Ucode 98, is used as a reference code in mu-law and A-law encoding.

7. The Digital Impairment Learning Sequence (DILS) of claim 1, wherein of the second segment, the specified pattern is selected such that the average of codes transmitted is zero for each bipolar training code, and the bipolar reference code in each slot of the repetition frame when averaged over the specified pattern period in each segment.

8. The Digital Impairment Learning Sequence (DILS) of claim 7, wherein of the specified pattern, the period is equal to 20 repetition frames (RF).

9. The Digital Impairment Learning Sequence (DILS) of claim 1, wherein of the specified pattern of claim 1, the spectrum of the pattern covers the signal bandwidth to keep the analog adaptive loops stable.

10. The Digital Impairment Learning Sequence (DILS) of claim 1, wherein the first segment of reference code training is realized using the specified pattern of the second segment, and wherein the training bipolar code is replaced by the reference bipolar code and the pattern is repeated for an adequate period of training time to accurately estimate the reference code in all the slots in a repetition frame, while still fine tuning the adaptive loops in the receiver.

11. The Digital Impairment Learning Sequence (DILS) of claim 10, wherein the number of specified pattern repetition for reference code training is 72.

12. The Digital Impairment Learning Sequence (DILS) of claim 1, wherein of the specified pattern to interleave the reference code and training code, adequate reference codes are used to keep the Decision Feedback Equalizer (DFE) and the other adaptive loops stable.

13. The Digital Impairment Learning Sequence (DILS) of claim 12, wherein of the specified pattern, the training to reference ratio is 70% to 30%.

14. The Digital Impairment Learning Sequence (DILS) of claim 1, wherein of the second segment, the transmission is alternated with higher power digital code and lower power digital code to maintain the signal path power and the resulting distortions in nominal range.

15. The Digital Impairment Learning Sequence (DILS) of claim 1, wherein of the second segment, the digital codes are grouped into subsets of one or more codes and the time codes in each subset is transmitted depended on the average power of the subset of codes, the lower power subsets training time being equal to or longer than the time of the higher power subsets.

16. The Digital Impairment Learning Sequence (DILS) of claim 1, wherein the second segment, the highest power digital code is limited to be sent based on the channel nonlinear distortion.

17. The Digital Impairment Learning Sequence (DILS) of claim 16, wherein the highest power training digital code is Ucode 119 for mu-law and A-law encoding.

18. The Digital Impairment Learning Sequence (DILS) of claim 1, wherein the second segment further comprises training on the higher power digital code subset in a separate group with adequate reference pattern frames in between each code, so as not to corrupt the smaller codes with higher Inter modulation and Inter symbol interference that would result from the higher power codes.

19. The Digital Impairment Learning Sequence (DILS) of claim 18, wherein the higher power subset is Ucode 112–119 for mu-law and A-law encoding.

20. The Digital Impairment Learning Sequence (DILS) of claim 1, wherein of the second segment, the number of lower digital codes transmitted are limited to digital codes with minimum distance separation that is needed for reliable estimation under the observed channel noise conditions.

21. The Digital Impairment Learning Sequence (DILS) of claim 20, wherein the minimum distance corresponds to the distance between Ucode1 and Ucode5 in mu-law and A-law encoding.

22. The Digital Impairment Learning Sequence (DILS) of claim 1, wherein of the second segment, the lowest digital code transmitted depends on the estimated base noise of the system.

23. The Digital Impairment Learning Sequence (DILS) of claim 22, wherein the lowest digital code corresponds to Ucode 12 in mu-law and A-law encoding.

24. The Digital Impairment Learning Sequence (DILS) of claim 1, wherein segment length for the digital code s is according to the following table for mu-law and A-law encoding:

| Ucode Range | Repetition Frame (RF) Length in Time Slots(6) |
| --- | --- |
| 0–15 | 120 |
| 16–31 | 80 |
| 32–47 | 80 |
| 48–63 | 60 |
| 64–79 | 40 |
| 80–95 | 40 |
| 96–111 | 20 |
| 112–127 | 2. |

25. The Digital Impairment Learning Sequence (DILS) of claim 1, wherein the specified pattern for interleaving training and reference code is according to the pattern specified in FIG. 2 for the mu-law and A-law encoding.

26. The Digital Impairment Learning Sequence (DILS) of claim 24, wherein the Digital Impairment Learning Sequence (DILS) is according to the sequence specified for the mu-law and A-law encoding for the first segment as Ucode 62 with a Length 1440 RF, and for the second segment as Ucode 12 to 119 with the length of each code according to the table in claim 24 and the sequencing of as follows:

112, 64, 113, 65, 114, 66, 115, 67, 116, 68, 117, 69, 118, 70, 119, 71, 72, 110, 74, 76, 108, 78, 80, 106, 82, 84, 104, 86, 88, 102, 90, 92, 100, 94, 96, 98, 99, 97, 95, 93, 101, 91, 89, 103, 87, 85, 105, 83, 81, 107, 79, 77, 109, 75, 73, 111, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 30, 28, 26, 24, 22, 20, 18, 16, 12.

27. The Digital Impairment Learning Sequence (DILS) of claim 1, wherein the DIL sequence to be transmitted is specified by the remote receiver.

28. The Digital Impairment Learning Sequence (DILS) of claim 1, wherein DIL sequence to be transmitted is derived locally.

\* \* \* \* \*